United States Patent
Carlson et al.

(10) Patent No.: US 8,315,648 B2
(45) Date of Patent: *Nov. 20, 2012

(54) RANGING IN UMTS NETWORKS

(75) Inventors: John Carlson, Dulles, VA (US); Tariqul Islam, Germantown, MD (US)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,256

(22) Filed: Feb. 14, 2012

(65) Prior Publication Data

US 2012/0142374 A1 Jun. 7, 2012

Related U.S. Application Data

(63) Continuation of application No. 11/984,207, filed on Nov. 14, 2007.

(51) Int. Cl.
*H04W 24/00* (2009.01)

(52) U.S. Cl. .................. 455/456.1; 370/259; 455/404.2; 455/414.1

(58) Field of Classification Search .................. 370/259; 455/404.2, 414.1, 456.1, 456.3, 456.5, 456.6, 455/457

See application file for complete search history.

(56) References Cited

U.S. PATENT DOCUMENTS

| | | | | |
|---|---|---|---|---|
| 6,687,507 | B2 * | 2/2004 | Fischer et al. | 455/456.6 |
| 7,031,722 | B2 * | 4/2006 | Naghian | 455/456.1 |
| 7,110,774 | B1 * | 9/2006 | Davis et al. | 455/456.1 |
| 7,505,774 | B1 * | 3/2009 | Trott | 455/458 |
| 7,680,501 | B2 * | 3/2010 | Sillasto et al. | 455/456.1 |
| 8,170,585 | B2 * | 5/2012 | Islam et al. | 455/456.5 |
| 2008/0130555 | A1 * | 6/2008 | Kalhan | 370/329 |

* cited by examiner

*Primary Examiner* — Jean A Gelin
*Assistant Examiner* — Michael S Bush
(74) *Attorney, Agent, or Firm* — Duane Morris LLP (57) ABSTRACT

A method and system for determining an approximate range from a location measurement unit to a mobile device. An uplink signal from the mobile device is received by the location measurement unit, and an uplink frame marker is determined from the uplink signal. A downlink signal is received at the location measurement unit from a base station serving the mobile device, and a downlink slot marker is determined from the downlink signal. A round trip propagation delay is determined based upon the uplink frame marker and the downlink slot marker, and an approximate range from the location measurement unit to the mobile device is determined as a function of the round trip propagation delay.

29 Claims, 7 Drawing Sheets

RANGING IN UMTS NETWORKS

This application is a continuation of U.S. patent application Ser. No. 11/984,207 filed 14 Nov. 2007 and titled "Ranging in UMTS Networks", the entire contents of which are hereby incorporated herein by reference.

BACKGROUND

The structure and operation of wireless communication systems are generally known. Examples of such wireless communication systems include cellular systems and wireless local area networks, among others. In a cellular system, a regulatory body typically licenses a frequency spectrum for a corresponding geographic area (service area) that is used by a licensed system operator to provide wireless service within the service area. A plurality of base stations may be distributed across the service area. Each base station services wireless communications within a respective cell. Each cell may be further subdivided into a plurality of sectors.

Location based services for mobile stations are expected to play an important role in future applications of wireless systems. A wide variety of technologies for locating mobile stations have been developed. Many of these have been targeted towards the Federal Communication Commission's ("FCC") requirement to determine the location of emergency 9-1-1 callers with a high degree of accuracy. The Wireless Communications and Public Safety Act ("the 911 Act") was enacted to improve public safety by encouraging and facilitating the prompt deployment of a nationwide, seamless communications structure for emergency services. The 911 Act directs the FCC to make "911" the universal emergency number for all telephone services. Emergency (911) calls from landlines provide the emergency dispatchers with the telephone number and the address of the caller thereby assisting emergency personnel in locating the emergency. As mobile stations became more widely used, an increasing number of emergency (911) calls are being made from mobile stations without a fixed address. Emergency call centers have recognized that relying upon the caller to describe their location caused a delay in service. Many mobile emergency (911) callers were unable to accurately describe their location, resulting in a further delay and, often times, a tragic outcome.

In 1996, the FCC issued a report and order requiring all wireless carriers and mobile phone manufacturers to provide the capability for automatically identifying to emergency dispatchers the location from which a wireless call was made. Implementation was divided into two phases. Phase I required wireless service providers and mobile phone manufacturers to report the telephone number of the mobile phone making the call as well as the base station controlling the mobile station which provided a general area from which the call was made. This information can be obtained from the network elements. Phase II of the FCC's Enhanced 911 ("E-911") mandate stated that by Oct. 1, 2002, wireless service providers must be able to pinpoint, by latitude and longitude, the location of a subscriber who calls emergency (911) from a mobile station. Wireless service providers were given the option of providing a network-based solution or a handset based solution. Wireless service providers who select a network-based solution are required to locate a mobile phone within 1000 meters 67% of the time.

Typical mobile station location technologies may be classified into external methods or network based methods. One example of an external method is the Global Positioning System ("GPS"). Network based methods may be further categorized depending on whether it is the network or the mobile station that performs necessary signal measurements. These signal measurements may involve the reception time of signals communicated between a base station ("BS") and a mobile station ("MS"), the angle of arriving signals or round trip delay measurements of signals communicated between a serving BS and an MS, or combinations thereof.

For example, most location methods require specific hardware in the MS and/or in the network. Traditional networks include Mobile Station Controllers ("MSC"), Base Station Controllers ("BSC") and Base Transceiver Station ("BTS") systems that jointly operate to communicate with mobile stations over a wireless communication link. Examples of common networks include GSM networks, North American Time Division Multiple Access ("TDMA") networks and Code Division Multiple Access ("CDMA") networks. Extensive infrastructures (e.g., ANSI-41 or MAP-based networks) exist in the cellular wireless networks for tracking mobility, distributing subscriber profiles, and authenticating physical devices. In wireless mobile networks providing a facility to determine a mobile station's geographic position, a network component commonly referred to as a Mobile Location Center ("MLC") performs the location calculation. Furthermore, in some networks, Location Measurement Units ("LMU") may be generally required for some methods to obtain knowledge about the relative time differences for sending signals to different mobile stations.

To establish a wireless communication link in traditional wireless networks, an MSC communicates with a BSC to prompt the BTS (collectively, "BS") to generate paging signals to a specified MS within a defined service area typically known as a cell or sector. The MS, upon receiving the page request, responds to indicate that it is present and available to accept an incoming call. Thereafter, the BS, upon receiving a page response from the MS, communicates with the MSC to advise it of the same. The call is then routed through the BS to the MS as the call setup is completed and the communication link is created.

One well-known method for locating a MS is triangulation. Signal power level or signal timing measurements between the MS and three or more base stations are used to triangulate. The signal power level or signal timing measurements are used to estimate the distance between each base station and the MS. The distances are plotted to determine a point of intersection. The point of intersection is the approximate transmitter location. For calculations using only signal power measurements, this method works only when the signal strength is relatively strong and not greatly affected by radio frequency (RF) fading, such as multipath interference common in urban environments. RF fading occurs when radiated signals encounter various obstacles that reflect and diffract the signal causing the received signal power level at the base station and mobile terminal to vary up to 30 dB. The requirement for a minimum of three base stations and the effect of RF fading limits the usefulness of triangulation.

Location techniques relying on measurements of timing differences, such as time difference of arrival ("TDOA") or enhanced observed time difference ("E-OTD"), require signal timing measurements between the MS and three or more separate base stations. If the network's base stations are not time synchronized then extra equipment is required at each base station to measure the timing difference between base stations in the network. If the standard wireless network is not capable of collecting signal timing measurements between three or more base stations and the mobile terminal, modification of the standard base station and optionally the handset are required. The modification of base stations and optionally handsets implies significant additional cost to wireless network operators.

The development of the Global Positioning System ("GPS") by the U.S. Department of Defense ("DoD") provides a means to fix a position using a system of orbiting satellites with orbital planes that guarantee that at least four satellites are visible at all times. This system provides location accuracy to within one meter for military systems possessing a Selective Availability ("SA") algorithm to filter out the intentional noise added to the signal. GPS systems without SA are limited to an accuracy of approximately 100 meters. Widespread use of the GPS and the decision to discontinue the LORAN-C navigation system convinced the DoD to drop SA thereby allowing commercial GPS receivers to dramatically increase accuracy. The FCC recognized that GPS receivers could be incorporated into mobile phones when it made minor adjustments to the Phase II schedule. Using GPS to report location, however, requires the mobile user to upgrade existing hardware or to purchase new hardware.

There is a need in the art for a method and apparatus to calculate a mobile station's location that avoids the limitations of the prior art such as the requirement for three or more separate base stations and one that does not require a mobile station or network hardware change to satisfy Phase I requirements while limiting the impact to the users and to the network operators. It is thus of interest to investigate what may be done with a minimum of network impact and expense.

Accordingly, there is a need for a method and system for maximizing the number of measurements that can be used for mobile location in a wireless network overlay location system. In view of the shortcomings of the prior art identified above, it is of great interest to identify other measurements that could be made to augment other location-related measurements and increase location yield and accuracy. Therefore, an embodiment of the present subject matter provides a novel method and system to derive a range estimate by exploiting a measured downlink timing of a serving cell site and combining this with a measured uplink time of arrival.

Another embodiment of the present subject matter provides a method for determining an approximate range from an LMU to a mobile device. The method comprises receiving at the LMU an uplink signal from the mobile device, determining an uplink frame marker from the uplink signal, and receiving at the LMU a downlink signal from a base station serving the mobile device. The method further comprises determining a downlink slot marker from the downlink signal, determining a round trip propagation delay based on the uplink frame marker and the downlink slot marker, and determining an approximate range from the LMU to the mobile device as a function of the round trip propagation delay.

In a further embodiment of the present subject matter, a communications network is provided for determining an approximate range to a mobile device. The network may comprise an LMU for receiving an uplink signal from a mobile device, circuitry for determining an uplink frame marker from the uplink signal, and a base station serving the mobile device for transmitting a downlink signal to the LMU. The network may further comprise circuitry for determining a downlink slot marker from the downlink signal, circuitry for determining a round trip propagation delay based on the uplink frame marker and the downlink slot marker, and circuitry for determining an approximate range from the LMU to the mobile device as a function of the round trip propagation delay.

These embodiments and many other objects and advantages thereof will be readily apparent to one skilled in the art to which the invention pertains from a perusal of the claims, the appended drawings, and the following detailed description of the embodiments.

DETAILED DESCRIPTION

With reference to the figures where like elements have been given like numerical designations to facilitate an understanding of the present subject matter, the various embodiments of a system and method for ranging in a communications network are described herein.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that some of the desired benefits of the present subject matter can be obtained by selecting some of the features of the present subject matter without utilizing other features. Accordingly, those who work in the art will recognize that many modifications and adaptations of the present subject matter are possible and may even be desirable in certain circumstances and are part of the present subject matter. Thus, the following description is provided as illustrative of the principles of the present subject matter and not in limitation thereof. While the following exemplary discussion of embodiments of the present subject matter may be directed towards or references specific telecommunications systems, it is to be understood that the discussion is not intended to limit the scope of the present subject matter in any way and that the principles presented are equally applicable to other communications networks, systems and associated protocols.

Those skilled in the art will appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto. In addition, it is possible to use some of the features of the present subject matter without the corresponding use of the other features. Accordingly, the foregoing description of exemplary or illustrative embodiments is provided for the purpose of illustrating the principles of the present subject matter and not in limitation thereof and may include modification thereto and permutations thereof.

The terms "device", "handset" and "station" are utilized interchangeably through the present disclosure and such use is not intended to limit the scope of the claims appended herewith.

Figure 1:
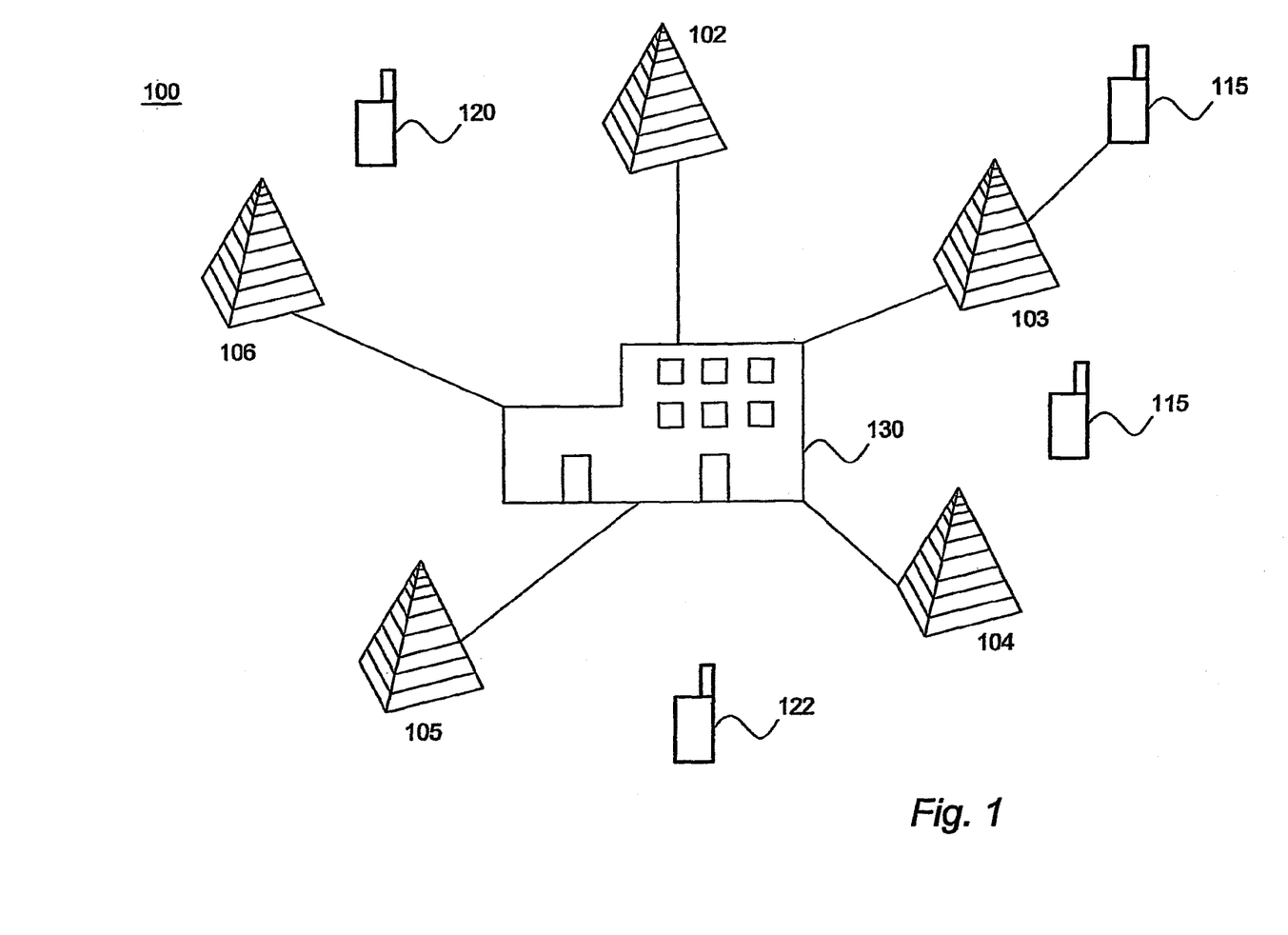
FIG. 1 is an illustration of a wireless communications network according to an embodiment of the present subject matter.

FIG. 1 is an illustration of a wireless communications network according to an embodiment of the present subject matter. With reference to FIG. 1, a wireless communications network 100 or system is shown. The network may be a Global System for Mobile Communication ("GSM") network, a Time Division Multiple Access ("TDMA") network, Code Division Multiple Access ("CDMA") network, a UMTS network, a Worldwide Interoperability for Microwave Access ("WiMax") network, a WiFi network, networks utilizing Evolution-Data Optimized ("EDVO"), CDMA2000 network, 1 times Radio Transmission Technology ("1×RTT") standards or another equivalent network.

Location measurement units ("LMU") 115 may be dispersed throughout the system or subsystem reception area. These LMUs 115 may be integrated with a base station 102-106 or may be independent of a base station 102-106. The wireless network 100 serves mobile stations or devices 120, 122 within reception range of at least one of the base stations 102-106. Mobile stations 120, 122 may include cellular telephones, text messaging devices, computers, portable computers, vehicle locating devices, vehicle security devices, communication devices, wireless transceivers or other devices with a wireless communications interface. Base station transceivers 102-106, also commonly referred to simply as base stations, are connected to a central entity or central network unit 130. The central entity 130 may be a base station controller ("BSC") in a base station subsystem ("BSS"), a Radio Network Controller ("RNC") in a Radio Access Network ("RAN"), or, for GSM, General Packet Radio Service ("GPRS") or UMTS system, a serving mobile location center ("SMLC") or an equivalent. The connection from each base station to a BSC, SMLC or other central network entity may employ a direct transmission link, e.g., a wired connection, microwave link, Ethernet connection, and the like, or may be employed by one or more intermediate entities, e.g., an intermediate BSC in the case of a connection from a BTS to an SMLC for GSM. Each mobile station 120, 122 may periodically measure the transmission timing difference between pairs of base stations 102-106. For example, a mobile station 120 may measure the difference in transmission timing for communication from its serving base station 102 and from one or more neighboring base stations, e.g., 106 and/or 103.

Figure 2:
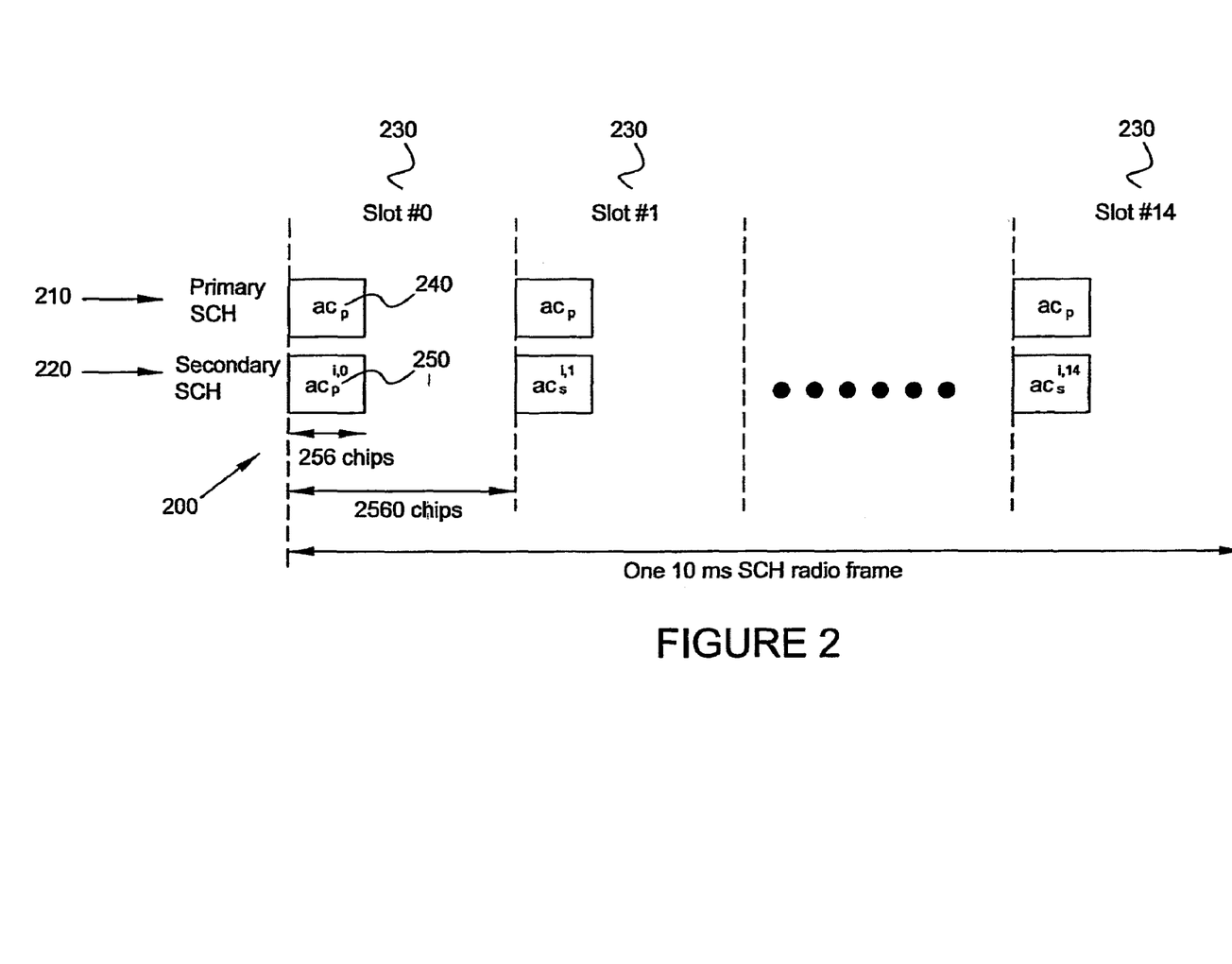
FIG. 2 is an illustration of the structure of a synchronization channel radio frame according to an embodiment of the present subject matter.

During a cell search, the mobile station 120 searches for a cell and determines the downlink scrambling code and frame synchronization of that cell. The cell search is typically carried out in three steps, slot synchronization, frame synchronization and code-group identification, and scrambling-code identification. During the first step of the cell search procedure the mobile station 120 uses a downlink signal commonly referred to as the Synchronization Channel ("SCH"). FIG. 2 is an illustration of the structure of a synchronization channel radio frame according to an embodiment of the present subject matter. With reference to FIG. 2, the SCH 200 consists of two sub channels, the Primary SCH 210 and the Secondary SCH 220. The Primary and Secondary SCH 210, 220 are divided into fifteen slots 230, each having a length of 2560 chips.

The Primary SCH 200 transmits a modulated code having a length of 256 chips and transmits the Primary Synchronization Code ("PSC") 240 (denoted as $c_p$) once every downlink slot 230. The PSC 240 is the same for every cell in the system and does not have any complex scrambling thereon.

The Secondary SCH 220 consists of repeatedly transmitting a sequence of modulated codes having a length of 256 chips. Secondary Synchronization Codes ("SSC") 250 are transmitted in parallel with the Primary SCH 210. The SSC 250 is denoted as $c_s^{i,k}$ where i=1, 2, ..., 64 and represents the number of the scrambling code group, and where k=0, 1, ..., 14 and represents the slot number. Each SSC 250 may be selected from a set of sixteen different codes having a length of 256 chips. This sequence on the Secondary SCH 220 indicates to which of the code groups a cell's downlink scrambling code belongs. The primary and secondary synchronization codes are modulated by the symbol a shown in FIG. 2 indicating the presence/absence of space time block coding based transmit antenna diversity ("STTD") encoding on the Primary Common Control Physical Channel ("P-CCPCH") and is listed in Table 1 below.

TABLE 1

| P-CCPCH STTD encoded | a = +1 |
| P-CCPCH not STTD encoded | a = −1 |

The P-CCPCH is a fixed rate (30 kbps, SF-256) downlink physical channel used to carry the broadcast channel ("BCH"). During slot synchronization, the mobile station utilizes the SCH's primary synchronization code to acquire slot synchronization to a cell. This is typically done with a single matched filter or any similar device matched to the PSC. The slot timing of the cell may then be obtained by detecting peaks in the matched filter output.

The PSC or $C_{psc}$ is constructed as a generalized hierarchical Golay sequence. The PSC generally exhibits good aperiodic auto correlation properties. The PSC may be defined as:

$$C_{psc}=(1+j)*<a,a,a,-a,-a,a,-a,-a,a,a,a,-a,a,-a,a,a>, \qquad (1)$$

where a=$<x_1, x_2, x_3, \ldots, x_{16}>$=<1, 1, 1, 1, 1, −1, −1, 1, −1, 1, −1, 1, −1, −1, 1>.

Figure 3A:
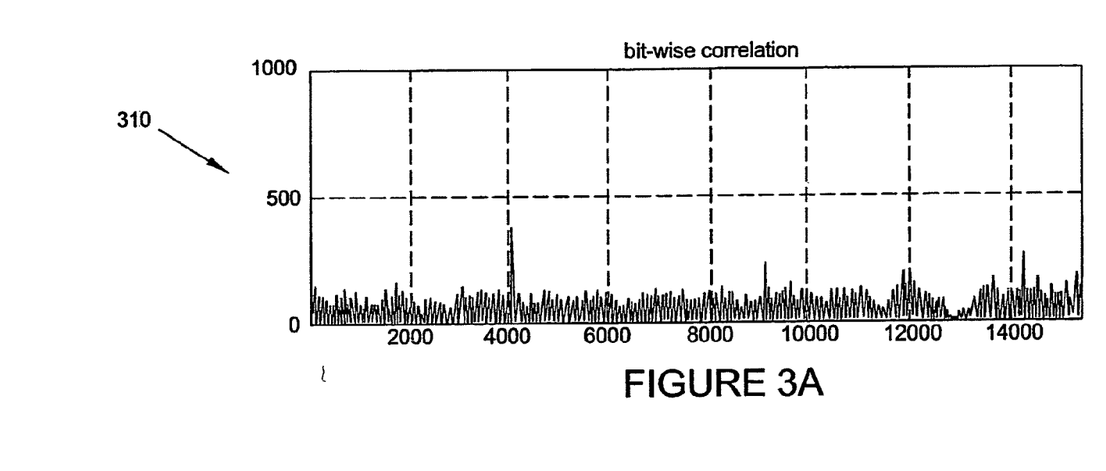
FIGS. 3A and 3B illustrate examples of detection of downlink slot markers according to embodiments of the present subject matter.
Figure 3B:
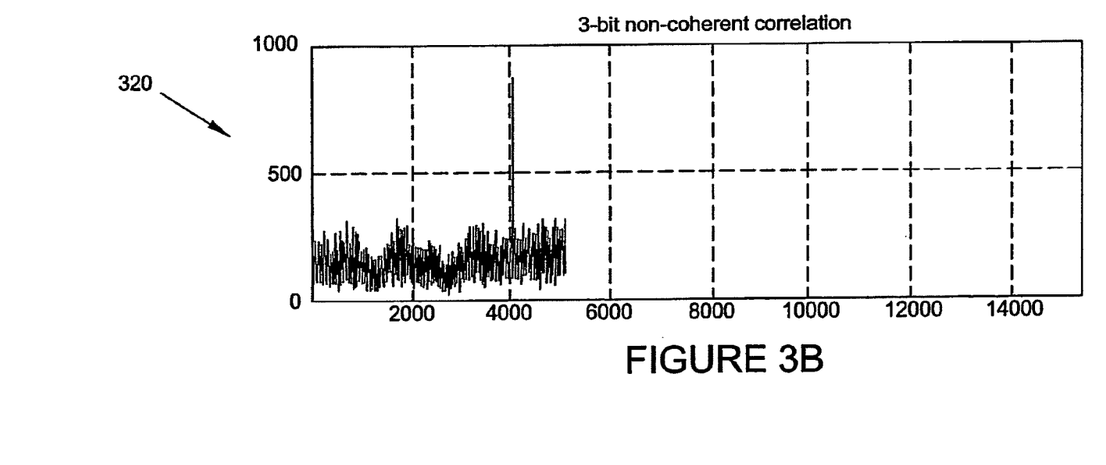

The PSC is generated by repeating the sequence a modulated by a Golay complementary sequence and creating a complex-valued sequence with identical real and imaginary components. Once the PSC is known, the PSC may be correlated against the downlink signal to detect the slot marker. In one embodiment of the present subject matter, a slotwise noncoherent addition technique may be applied for higher detection confidence. By way of a non-limiting example, FIGS. 3A and 3B illustrate an exemplary detection of downlink slot markers according to embodiments of the present subject matter. With reference to FIGS. 3A and 3B, approximately four slots of downlink samples from a CMU operating in UMTS terrestrial radio access ("UTRA") Band II were collected. The slot markers were detectable using both 256 chip long correlation 310 and 3-bit noncoherent additions of 256 chip long correlations 320.

Figure 4:
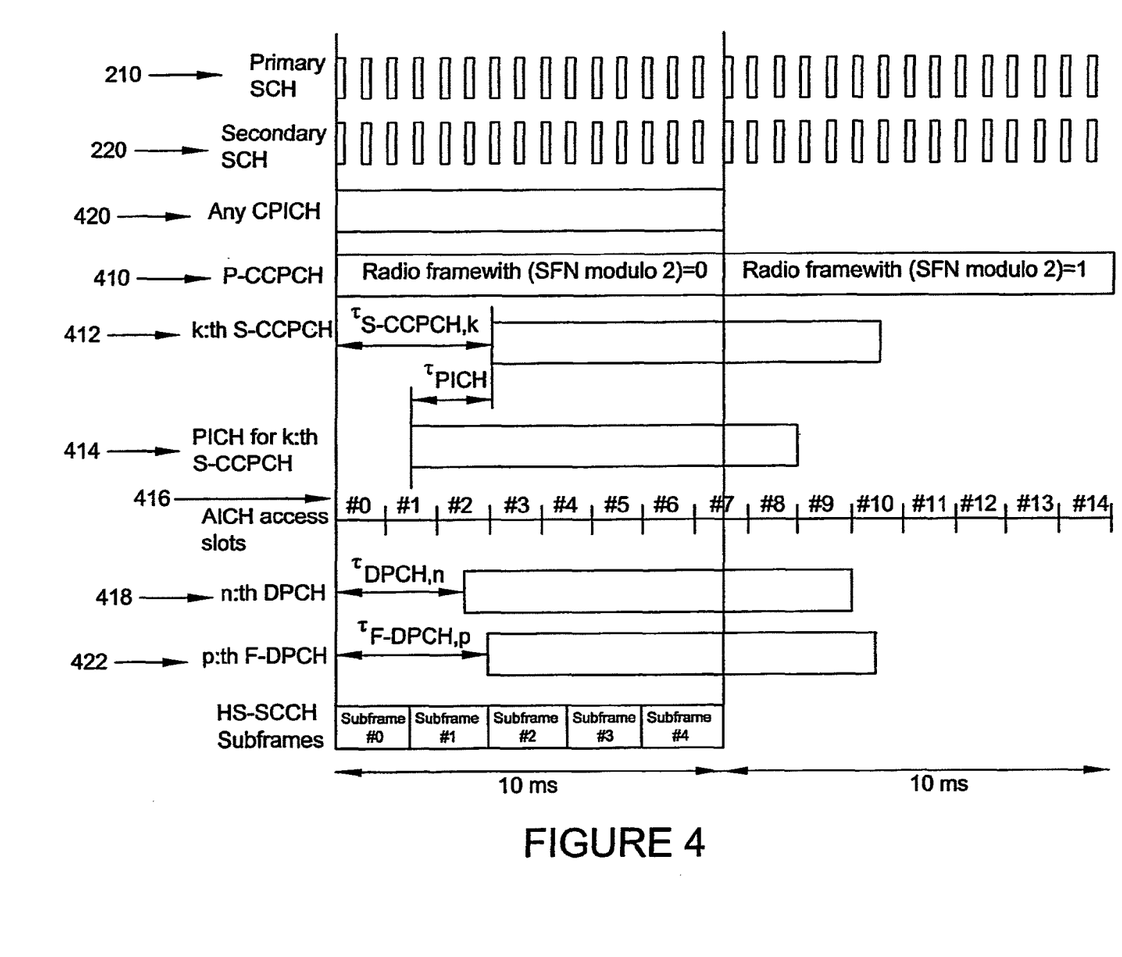
FIG. 4 is an illustration of the timing relationships between downlink physical channels according to an embodiment of the present subject matter.

FIG. 4 is an illustration of the timing relationships between downlink physical channels according to an embodiment of the present subject matter. With reference to FIG. 4, the P-CCPCH 410, on which the cell system frame number ("SFN") is transmitted, is used as the timing reference for all the physical channels, directly for downlink and indirectly for uplink. The Primary SCH 210, the Secondary SCH 220, the Primary and Secondary CPICH 420, and the P-CCPCH 410 all have identical frame timings.

The Secondary Common Control Physical Channel ("S-CCPCH") timing 412 may be different for different S-CCPCHs, but the offset from the P-CCPCH frame timing is a multiple of 256 chips, i.e., $\tau_{S-CCPCH,k}=T_k*256$ chip, $T_k\epsilon\{0, 1, \ldots, 149\}$. The PICH timing 414 is $\tau_{PICH}=7680$ chips prior to its corresponding S-CCPCH frame timing 412. The AICH access slot #0 starts the same time as a P-CCPCH frame 410 with SFN modulo 2=0. The Downlink Dedicated Physical Channel ("DPCH") timing 418 may be different for different DPCHs, but the offset from the P-CCPCH frame timing is a multiple of 256 chips, i.e., $\tau_{DPCH,n}=T_n*256$ chip, $T_n\epsilon\{0, 1, \ldots, 149\}$. The Fractional DPCH ("F-DPCH") timing 422 may be different for different F-DPCHs, but the offset from the P-CCPCH frame timing is a multiple of 256 chips, i.e., $\tau_{F-DPCH,p}=T_p*256$ chip, $T_p\epsilon\{0, 1, \ldots, 149\}$.

The three sectors of a base station are generally locked to a common reference clock or frequency source. Therefore, the relative time differences of the downlink frames of the three sectors are constant, although the reference clock may itself drift. The time difference of the downlink frames in different sectors at the same site is generally a multiple of 256 chips. Table 2 below provides a definition of some synchronization parameters and clarifies the timing relationship of the sectors. The parameters listed in Table 2 are not intended to be an exhaustive list as Section 5 of TS 25.402 provides a more comprehensive list, and thus should not limit the scope of the claimed appended herewith.

TABLE 2

| | |
|---|---|
| BFN | Node B Frame Number counter. This is the Node B common frame number counter. Range: 0 . . . 4095 frames. |
| SFN | Cell SFN counter. SFN is sent on BCH. SFN is used for paging groups and system information scheduling, etc. In FDD SFN = BFN adjusted with T_cell. Range: 0 . . . 4095 frames |
| [FDD - T_cell] | T_cell represents the Timing delay used for defining the start of SCH, CPICH and the DL Scrambling Code(s) in a cell relative BFN. The main purpose is to avoid having overlapping SCHs in different cells belonging to the same Node B. A nSCH burst is 256 chips long. SFN in a cell is delayed T_cell relative BFN. Resolution: 256 chips. Range: 0 . . . 9 × 256 chips. |

The mobile station 120 has the capability to follow the frame timing change of the serving site (Node B). The uplink DPCCH/DPDCH frame transmission takes approximately $T_o$ chips after the reception of the first detected path (in time) of the corresponding downlink DPCCH/DPDCH frame from the reference cell. $T_o$ is a constant defined to be 1024 chips.

At the mobile station, the uplink DPCCH/DPDCH frame transmission takes place approximately $T_o$ chips after the reception of the first detected or significant path (in time) of the corresponding downlink DPCCH/DPDCH or F-DPCH frame. The mobile station initial transmission timing error $T_o$ is maintained within ±1.5 chips at the mobile station. The reference point for the mobile station initial transmit timing control requirement is the time when the first detected path (in time) of the corresponding downlink DPCCH/DPDCH frame is received from the reference cell plus $T_o$ chips. When the mobile station is not in soft handover, the reference cell is the one the mobile station has in the active set. The cell, which is selected as a reference cell, remains as a reference cell even if other cells are added to the active set. In the instance that the reference cell is removed from the active set, the mobile station adjusts its respective transmit timing no later than the time when the whole active set update message is available at the mobile station. The mobile station is also capable of changing the transmission timing according to the received downlink DPCCH/DPDCH frame.

To determine timing relationships between uplink and downlink signals the offsets between the DPCHs of the three sectors of a base station are multiples of 256 chips, the offset between the start of DPCH and SCH is a multiple of 256 chips, and the offset between DL-DPCH and UL-DPCCH is multiple of 256 chips ($T_o=4*256$ chips). It follows that upon detection of the DL slot marker of any of the collocated sectors and the UL frame marker, embodiments of the present subject matter may be able to resolve, without any further processing of the DL signal, the round trip time within 256 chips. Generally, 256 chips correspond to a 20 km round trip distance or 10 km range, which is more than adequate for range ring application.

Exemplary LMUs may be collocated with the serving base station. In the event that an exemplary LMU monitors a neighboring cells' downlink signals (which transmit the same SCH utilized as reference for correlation), spurious peaks may be seen in the correlation result if the downlink signals of the neighboring sectors are strong. Embodiments of the present subject matter may thus correlate for a delay of 256 chips and then add all correlation results non-coherently to thereby align the DL slot markers of the three collocated sectors. For this non-coherent addition, the resultant peak for the collocated site will be enhanced, and the peaks for the neighboring sites (sectors of different base stations) will not line up because the peaks for the neighboring sites are not frequency locked to each other and also because the signal propagation is different in each case.

Figure 5:
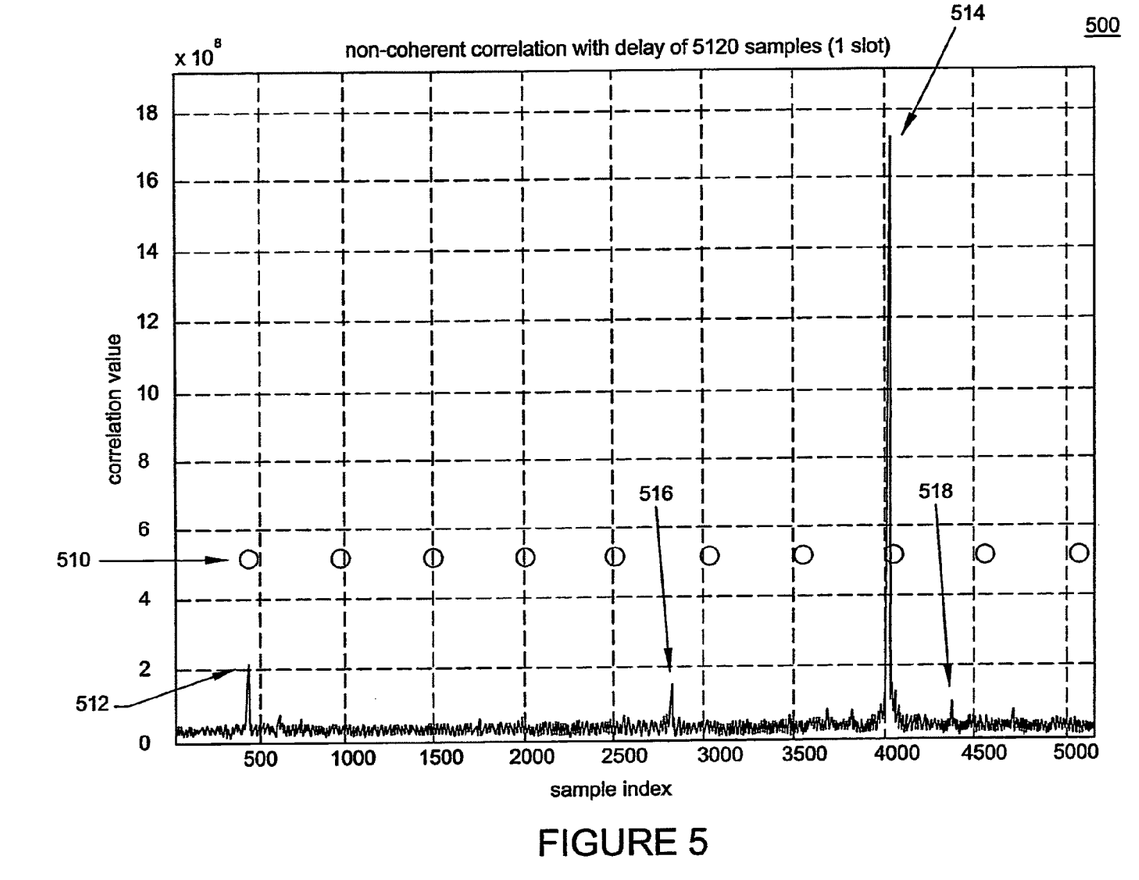
FIG. 5 is an illustration of an example of a non-coherent correlation result having a delay of one slot according to an embodiment of the present subject matter.

By way of a non-limiting example, FIG. 5 illustrates an exemplary non-coherent correlation result having a delay of one slot according to an embodiment of the present subject matter. With reference to FIG. 5, a non-coherent correlation result 500 with a delay of 5120 samples (i.e., 2560 chips or one slot) is shown. The circles 510 in the plot indicate 512-sample (256-chip) jumps from the highest peak found. It should be noted that the peaks on the 1st and 8th markers 512, 514 are from the collocated sectors. The two other weak peaks, between 5th and 6th markers 516 and 8th and 9th markers 518, are from the downlink signals of neighboring cells.

Figure 6:
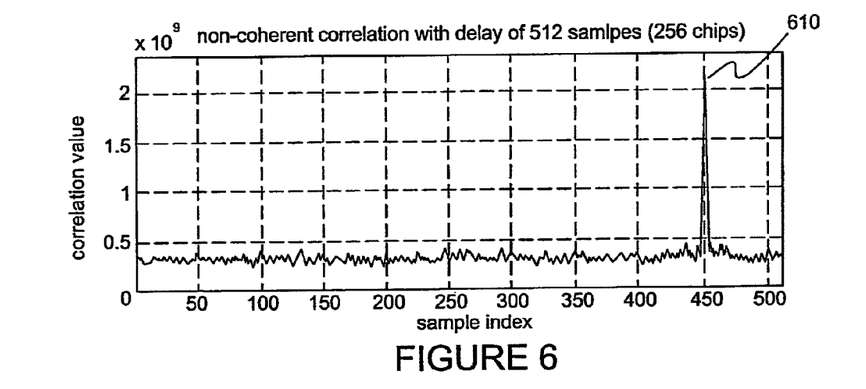
FIG. 6 is an illustration of a folding of the non-coherent correlation result of FIG. 5.

FIG. 6 is an illustration of a folding of the non-coherent correlation result of FIG. 5. With reference to FIG. 6, if the 5120 sample long correlation results of FIG. 5 are folded into ten segments of 512 samples each, a prominent peak 610 may be identified corresponding to only the peak from the collocated site. Thus, spurious peaks detected at an exemplary LMU from the downlink signals of neighboring cells 516, 518 may be faded and the DL slot markers for the collocated sectors 512, 514 may be enhanced providing the prominent peak 610 illustrated in FIG. 6. Therefore, exemplary embodiments of the present subject matter may thus correlate for a delay of 256 chips and then add all correlation results non-coherently, i.e., folding, to thereby align the DL slot markers of collocated sectors.

Figure 7:
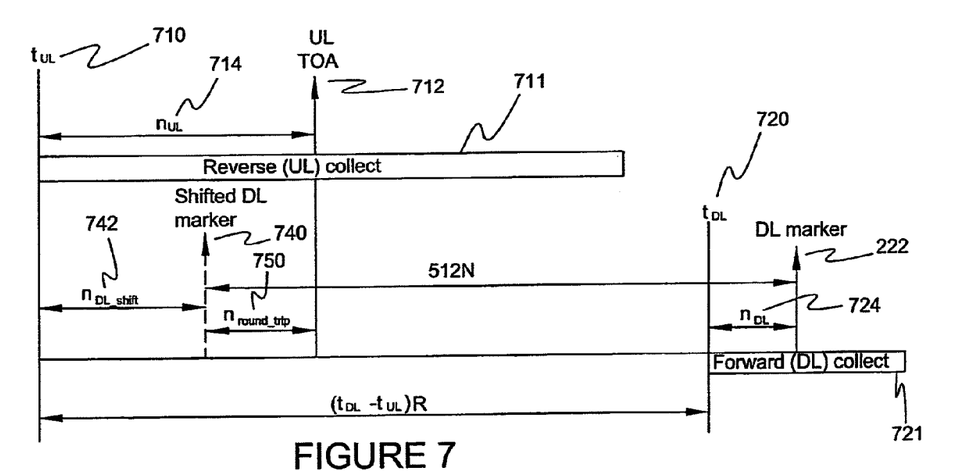
FIG. 7 is an illustration of an estimation of round trip propagation delay according to an embodiment of the present subject matter.

FIG. 7 is an illustration of an estimation of round trip propagation delay according to an embodiment of the present subject matter. With reference to FIG. 7, the time stamp of an uplink signal 710 during the reverse collection period 711 is represented as $t_{UL}$ and measured in seconds. The collector thread, at the end of reverse collection period, may tune to the downlink frequency and collect downlink samples and the time stamp for the second collection period 721 may also be noted. The time stamp of a downlink signal 720 during the forward collection period 721 is represented as $t_{DL}$ and measured in seconds. The uplink time of arrival ("UL TOA") frame marker 712 is measured $n_{UL}$ samples 714 from $t_{UL}$. The downlink marker 722 (e.g., slot marker folded to 512 samples) is measured $n_{DL}$ samples 724 from $t_{DL}$. To estimate the round trip propagation delay 750 ($n_{round\_trip}$), the downlink marker 722 must be shifted. A shifted downlink marker 740 may be shifted a number of samples ($n_{DL\_shift}$) from $t_{DL}$ as represented by the following relationship:

$$n_{DL\_shift}=(t_{DL}-t_{UL})R+n_{DL}-512N \quad (2)$$

where $n_{DL\_shift}$ 742 represents the number of samples the downlink marker has been shifted from $t_{UL}$, R is a sample rate in Hz, and N is an integer such that:

$$0<=n_{UL}-((t_{DL}-t_{UL})R+n_{DL}-512N)<512 \quad (3)$$

An exemplary sample rate R may be, but is not limited to 7.68 MHz.

After $n_{DL\_shift}$ 742 has been found, round trip propagation delay 750 may be estimated as a function of the following relationship:

$$n_{round\_trip}=n_{UL}-n_{DL\_shift} \quad (4)$$

where $n_{round\_trip}$ is the round trip propagation delay in samples. It follows that the radius of a corresponding range ring may be estimated as a function of the following relationship:

$$r_{range\_ring}=0.5*n_{round\_trip}*39.0625 \text{ meters} \quad (5)$$

It should be noted that since the UL-DL timing provides an inherent jitter of ±1.5 chips or ±3 samples, a value of $n_{round\_trip}$ greater than 509 may not be reliable. In such embodiments of the present subject matter, the range ring radius will be zero if $n_{round\_trip}$ is greater than 500 samples.

The range ring is generally applicable for the serving site which governs the mobile station timing. Thus, the serving sector identifier (UC-ID) is generally available in the respective network tipping information list. While the DTP interface does not provide this information, the following steps may be taken to resolve such issues: change the DTP-GCS interface to include all of the primary scrambling code with their relative strengths; populate the "Pilot Offset" fields of NMS with the primary scrambling code of the UMTS sectors during DTP based testing; and/or GCS will match the strongest primary scrambling code with the database and will decide which site is the serving one.

In one aspect of the present subject matter, if field tests indicate that slot markers are detected from base stations other than the serving base station, all the range rings smaller than 1 km (i.e., $n_{round\_trip}$<26 chips) may be passed to a processor and the processor will filter and/or determine which range ring to utilize based upon information available thereto, including but not limited to, information arriving through a hybrid combination of location technologies such as triangulation, trilateration, time difference of arrival, GPS, angle of arrival, Cell-ID, signal strength, assisted-GPS, Enhanced Observed Time Difference, Advanced Forward Link Trilateration, etc.

In another aspect of the present subject matter, range rings may be utilized when one or more sites detect TOA. Further, a range ring solution for GSM generally requires keeping track of network deployment information whereas the solution for UMTS does not require knowledge of network configuration such as base station timing offsets, etc.

Figure 8:
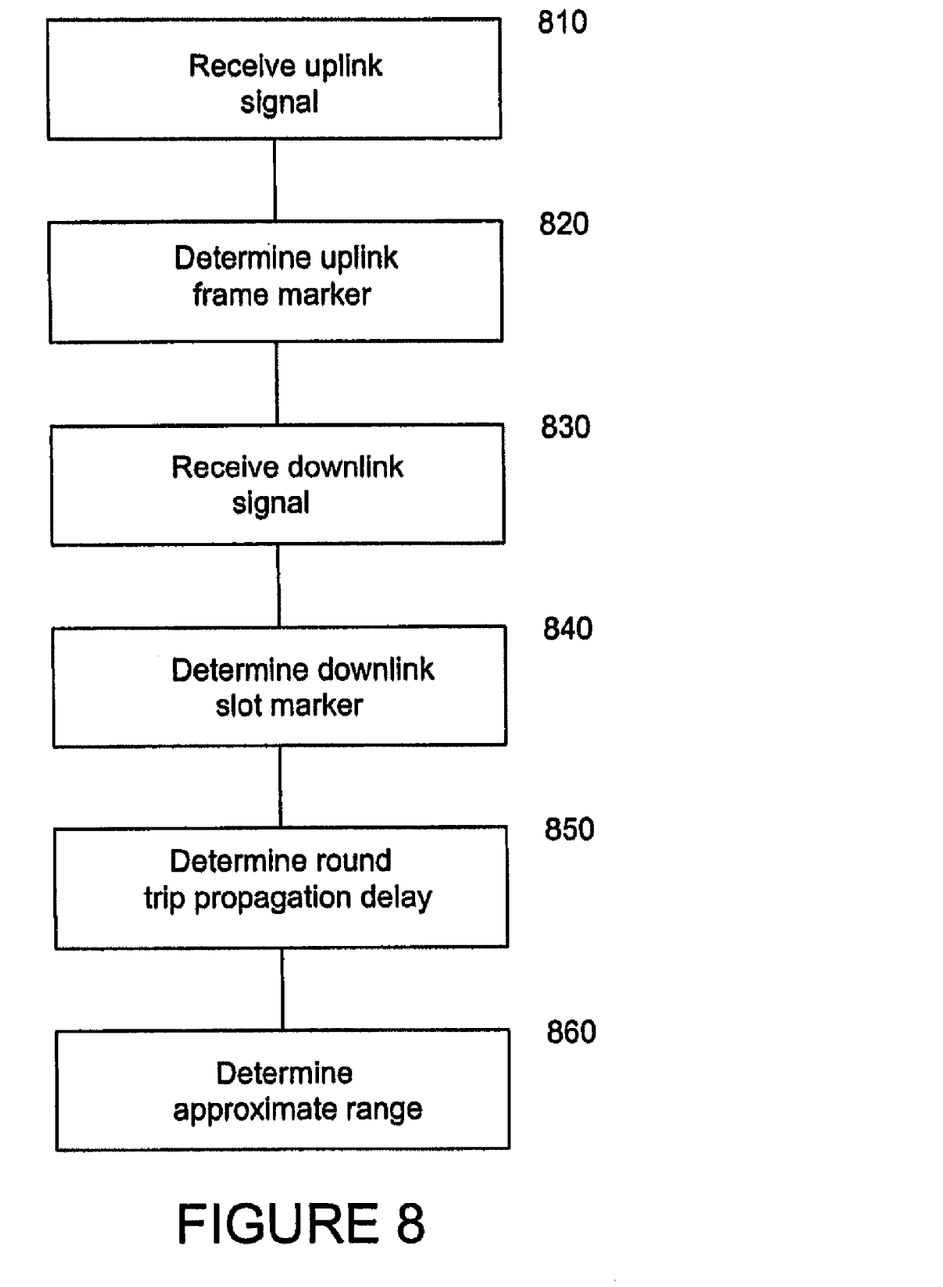
FIG. 8 is an algorithm according to one embodiment of the present subject matter.

FIG. 8 is an algorithm according to one embodiment of the present subject matter. With reference to FIG. 8, a method for determining an approximate range from a LMU to a mobile device is provided. Exemplary communications networks employing an LMU according to embodiments of the present subject matter may be a UMTS network, WiMax network, GSM network, WiFi network, CDMA network or a network utilizing Evolution-Data Optimized ("EDVO"), IS-95, CDMA2000, and/or 1 time Radio Transmission Technology ("1×RTT") standards. However, the aforementioned examples are not intended to limit the scope of the claims appended herewith. In step 810, an uplink signal may be received at the LMU from the mobile device. An exemplary mobile device may be, but is not limited to a cellular telephone, text messaging device, computer, portable computer, vehicle locating device, vehicle security device, communication device, and wireless transceiver. In step 820, an uplink frame marker is determined from the uplink signal. In step 830, a down link signal from a base station serving the mobile device may be received at the LMU and a downlink slot marker determined from the downlink signal in step 840. In one embodiment of the present subject matter, the LMU and the serving base station may be co-located. In another embodiment of the present subject matter, the downlink signal may be from a sector other than the sector serving the mobile device. In yet another embodiment of the present subject matter, the downlink slot marker may be, but is not limited to, a modulo 512 multiple. Further, the downlink slot marker may be a function of equation (3) provided above. The round trip propagation delay may be determined in step 850 based upon the uplink frame marker and the downlink slot marker. In step 860, an approximate range from the LMU to the mobile device may be determined as a function of the round trip propagation delay. Of course, the approximate range may be determined as a function of signals received from one or more LMUs installed throughout an exemplary communications network.

In one embodiment of the present subject matter, step 820 may also include determining a first time stamp for the uplink signal and determining a number of samples between the first time stamp and the uplink frame marker. When determining the downlink slot marker, further embodiments of the present subject matter may also determine a second time stamp for the downlink signal and determine a number of samples between the second time stamp and the downlink slot marker. In another embodiment of the present subject matter, the round trip propagation delay may be determined by shifting the downlink slot marker a number of samples such that the number of samples between the uplink frame marker and the downlink slot marker is less than 512, and determining the number of samples between the uplink frame marker and the shifted downlink slot marker. In yet another embodiment of the present subject matter, an approximate range may be determined from the LMU to the mobile device by multiplying the number of samples between the uplink frame marker and the shifted downlink slot marker by a predetermined number. The predetermined number may be, but is not limited to, 19.53125. Further, the number of samples between the uplink frame marker and the shifted downlink slot marker may be determined by a non-limiting exemplary sample rate of 7.68 MHz.

As shown by the various configurations and embodiments illustrated in FIGS. 1-8, a system and method for ranging in a communications network have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for determining an approximate range from a location measurement unit ("LMU") to a mobile device, comprising:
   (a) receiving at said LMU an uplink signal from said mobile device;
   (b) determining an uplink frame marker from said uplink signal;
   (c) receiving at said LMU a downlink signal from a base station serving said mobile device;
   (d) determining a downlink slot marker from said downlink signal;
   (e) determining a round trip propagation delay based on said uplink frame marker and said downlink slot marker; and
   (f) determining an approximate range from said LMU to said mobile device as a function of said round trip propagation delay,
   wherein the step of determining the downlink slot marker includes:
      (i) receiving downlink signals from neighboring base stations,
      (ii) correlating all received downlink signals for a predetermined chip delay, and
      (ii) non-coherently adding all correlated signals.

2. The method of claim 1 wherein determining the uplink frame marker includes:
   (i) determining a first time stamp for said uplink signal; and
   (ii) determining a number of samples between said first time stamp and said uplink frame marker.

3. The method of claim 2 wherein determining the downlink slot marker includes:
   (i) determining second time stamps for said received downlink signals; and
   (ii) determining a number of samples between said second time stamps and said downlink slot marker.

4. The method of claim 3 wherein determining the round trip propagation delay includes:
   (i) shifting said downlink slot marker a number of samples such that the number of samples between said uplink frame marker and said downlink slot marker is less than 512; and
   (ii) determining the number of samples between said uplink frame marker and said shifted downlink slot marker.

5. The method of claim 4 wherein determining an approximate range from said LMU to said mobile device includes multiplying the number of samples between said uplink frame marker and said shifted downlink slot marker by a predetermined number.

6. The method of claim 5 wherein said predetermined number is 19.53125.

7. The method of claim 5 wherein said number of samples between said uplink frame marker and said shifted downlink slot marker are determined by a sample rate of 7.68 MHz.

8. The method of claim 1 wherein said LMU and said serving base station are co-located.

9. The method of claim 1 wherein the downlink signal is from a sector other than the sector serving said mobile device.

10. The method of claim 1 wherein said mobile device is selected from the group consisting of: cellular telephone, text messaging device, computer, portable computer, vehicle locating device, vehicle security device, communication device, and wireless transceiver.

11. The method of claim 1 wherein said approximate range is determined as a function of signals received from one or more LMUs installed throughout a communications network.

12. The method of claim 1 wherein said downlink slot marker is a modulo 256R multiple, wherein R is the number of samples per chip.

13. The method of claim 1 wherein said downlink slot marker is a function of the following relationship:

$$0 \leq n_{UL} - ((t_{DL} - t_{UL})R + n_{DL} - 512N) < 512,$$

wherein $t_{UL}$ is the time stamp of said uplink signal, $t_{DL}$ is the time stamp of said downlink signal, $n_{UL}$ is the time of arrival of said uplink frame marker, $n_{DL}$ is the location of said downlink slot marker, R is a sample rate, and N is an integer.

14. The method of claim 1 wherein said predetermined chip delay is 256 chips.

15. The method of claim 1 wherein said downlink slot marker is a function of the following relationship:

$$0 < n_{UL} - ((t_{DL} - t_{UL})R1 + n_{DL} - 256(R2)N) < 256(R2),$$

wherein $t_{UL}$ is the time stamp of said uplink signal, $t_{DL}$ is the time stamp of said downlink signal, $n_{UL}$ is the time of arrival of said uplink frame marker, $n_{DL}$ is the location of said downlink slot marker, R1 is a sample rate, R2 is the number of samples per chip, and N is an integer.

16. The method of claim 1 wherein said LMU is installed in a communications network selected from the group consisting of: Universal Mobile Telecommunications System ("UMTS") network, Worldwide Interoperability for Microwave Access ("WiMax") network, Global System for Mobile Communications ("GSM") network, WiFi network, Code Division Multiple Access ("CDMA") network.

17. The method of claim 1 wherein said LMU operates under a standard selected from the group consisting of: IS-95, Evolution-Data Optimized ("EDVO"), CDMA2000, and 1 times Radio Transmission Technology ("1×RTT").

18. A communications network for determining an approximate range to a mobile device, comprising:
   (a) a location measurement unit ("LMU") for receiving an uplink signal from a mobile device;
   (b) circuitry for determining an uplink frame marker from said uplink signal;
   (c) a base station serving said mobile device for transmitting a downlink signal to said LMU;
   (d) circuitry for determining a downlink slot marker from said downlink signal;
   (e) circuitry for determining a round trip propagation delay based on said uplink frame marker and said downlink slot marker;
   (f) circuitry for determining an approximate range from said LMU to said mobile device as a function of said round trip propagation delay; and
   (g) a second base station for transmitting a second downlink signal to said LMU,
   wherein said circuitry for determining a downlink slot marker includes:
      (i) circuitry for correlating all received downlink signals for a predetermined chip delay, and
      (ii) circuitry for non-coherently adding all correlated signals.

19. The network of claim 18 wherein the circuitry for determining the uplink frame marker includes circuitry for:
  (i) determining a first time stamp for said uplink signal; and
  (ii) determining a number of samples between said first time stamp and said uplink frame marker.

20. The network of claim 19 wherein the circuitry for determining the downlink slot marker includes circuitry for:
  (i) determining second time stamps for said received downlink signals; and
  (ii) determining a number of samples between said second time stamps and said downlink slot marker.

21. The network of claim 20 wherein the circuitry for determining the round trip propagation delay includes circuitry for:
  (i) shifting said downlink slot marker a number of samples such that the number of samples between said uplink frame marker and said downlink slot marker is less than 512; and
  (ii) determining the number of samples between said uplink frame marker and said shifted downlink slot marker.

22. The network of claim 18 wherein said LMU and said serving base station are co-located.

23. The network of claim 18 wherein said downlink signal is provided from a sector other than the sector serving said mobile device.

24. The network of claim 18 wherein said mobile device is selected from the group consisting of: cellular telephone, text messaging device, computer, portable computer, vehicle locating device, vehicle security device, communication device, and wireless transceiver.

25. The network of claim 18 wherein said approximate range is determined as a function of signals received from one or more LMUs installed throughout a communications network.

26. The network of claim 18 wherein said downlink slot marker is a modulo 256R multiple, wherein R is the number of samples per chip.

27. The network of claim 18 wherein said communications network is selected from the group consisting of: Universal Mobile Telecommunications System ("UMTS") network, Worldwide Interoperability for Microwave Access ("WiMax") network, Global System for Mobile Communications ("GSM") network, WiFi network, Code Division Multiple Access ("CDMA") network.

28. The network of claim 18 wherein said communications network operates under a standard selected from the group consisting of: IS-95, Evolution-Data Optimized ("EDVO"), CDMA2000, and 1 times Radio Transmission Technology ("1×RTT").

29. The network of claim 18 wherein said predetermined chip delay is 256 chips.

* * * * *